US00RE39813E

(19) United States
(12) Reissued Patent
Carnes et al.

(10) Patent Number: US RE39,813 E
(45) Date of Reissued Patent: Sep. 4, 2007

(54) VACUUM-ASSISTED PUMP

(75) Inventors: William B. Carnes, Milwaukie, OR (US); Milton K. Leonard, Lake Oswego, OR (US); Robert B. Ray, Vancouver, WA (US)

(73) Assignee: Roper Holdings, Inc., Wilmington, DE (US)

(21) Appl. No.: 10/962,257

(22) Filed: Oct. 8, 2004

Related U.S. Patent Documents

Reissue of:
(64) Patent No.: 6,409,478
Issued: Jun. 25, 2002
Appl. No.: 09/258,833
Filed: Feb. 26, 1999

(51) Int. Cl.
*F04D 9/04* (2006.01)

(52) U.S. Cl. ..... 417/200
(58) Field of Classification Search ..... 417/200, 417/201, 202, 203
See application file for complete search history.

(56) References Cited

U.S. PATENT DOCUMENTS

| | | | | | |
|---|---|---|---|---|---|
| 1,201,594 | A | * | 10/1916 | King | 417/201 |
| 1,475,994 | A | * | 12/1923 | Havens | 417/202 |
| 1,840,257 | A | * | 1/1932 | Saxe et al. | 417/200 |
| 1,910,775 | A | * | 5/1933 | Saxe | 417/200 |
| 2,192,442 | A | * | 3/1940 | Hoffman | 417/201 |
| 2,845,875 | A | * | 8/1958 | Corbett | 417/201 |
| 4,249,865 | A | * | 2/1981 | Sloan | 417/200 |

* cited by examiner

*Primary Examiner*—Michael Koczo, Jr.
(74) *Attorney, Agent, or Firm*—Kolisch Hartwell, P.C.

(57) ABSTRACT

A self-priming centrifugal pump including a supplementary vacuum pump and a float valve. The vacuum pump serves to draw liquid to the pump for priming and the float valve shut of flow to the vacuum pump when liquid reaches a predetermined level to prevent entry of liquid into the vacuum pump. In some embodiments the float valve includes an o-ring valve seal and the vacuum pump includes an oil delivery system to distribute oil from an oil reservoir to improve lubrication.

24 Claims, 5 Drawing Sheets

VACUUM-ASSISTED PUMP

Matter enclosed in heavy brackets [ ] appears in the original patent but forms no part of this reissue specification; matter printed in italics indicates the additions made by reissue.

FIELD OF THE INVENTION

This invention relates to centrifugal pumps and more particularly to centrifugal pumps with vacuum-assisted self-priming.

BACKGROUND

Centrifugal pumps are the most common pumps for moving liquids from place to place and are used in irrigation, domestic water systems, sewage handling and many other applications. Liquid is urged through the pump by a spinning disk-shaped impeller positioned inside an annular volute. The volute has an eye at the center where water enters the pump and is directed into the center of the impeller. The rotation of the impeller flings the liquid outward to the perimeter of the impeller where it is collected for tangential discharge. As the liquid is driven outward, a vacuum is created at the eye, which tends to draw more fluid into the pump.

One of the principle limitations on the use of centrifugal pumps is their limited ability to draw fluid for priming when starting from an air-filled or dry condition. The impeller, which is designed to pump liquids, often cannot generate sufficient vacuum when operating in air to draw liquid up to the pump when the standing level of the liquid is below the eye of the pump. Once the liquid reaches the eye, the outward motion of the liquid away from the eye creates the vacuum necessary to draw a continuing stream of liquid. However, until liquid reaches the impeller, very little draw is generated.

In many applications, such as dewatering construction sites or pits, the standing water level is many feet below the level of the pump. As a result, when the pump is not in operation, there is no water in the pump. To begin pumping, the pump must first self-prime by drawing water up to the pump from the standing water lever or the pump must be manually primed by being filled with water from a secondary source. Since manual priming requires user intervention, it is generally preferable that the pump be capable of self-priming. This is particularly true in applications, such as dewatering, where pump operation is intermittent and the need for priming recurrent.

To supplement the limited capability of the spinning impeller to generate vacuum, an auxiliary vacuum pump is sometimes used with centrifugal pumps. This vacuum pump, which is typically a positive displacement-type pump, has an intake near the eye of the impeller. As the vacuum pump draws a vacuum, water is drawn up to the centrifugal pump for priming. A float valve is provided between the vacuum pump and the input near the eye of the impeller to close off the intake when the centrifugal pump has been primed. This valve prevents water from reaching and possibly damaging the vacuum pump.

In pumps used for dewatering, reliability is of critical importance. If a pump for dewatering a site fails, the site and equipment at the site may be flooded. Although centrifugal pumps are relatively simple and reliable, in the past, the valves and vacuum pumps used to for self-priming have proven less reliable. For instance, prior float valves have not reliably shut off when water reached the pump, thereby allowing water to enter and damage the vacuum pump. Similarly, prior vacuum pumps have exhibited unacceptable internal failure rates even when the float valve is operating correctly.

DETAILED DESCRIPTION

Figure 1:
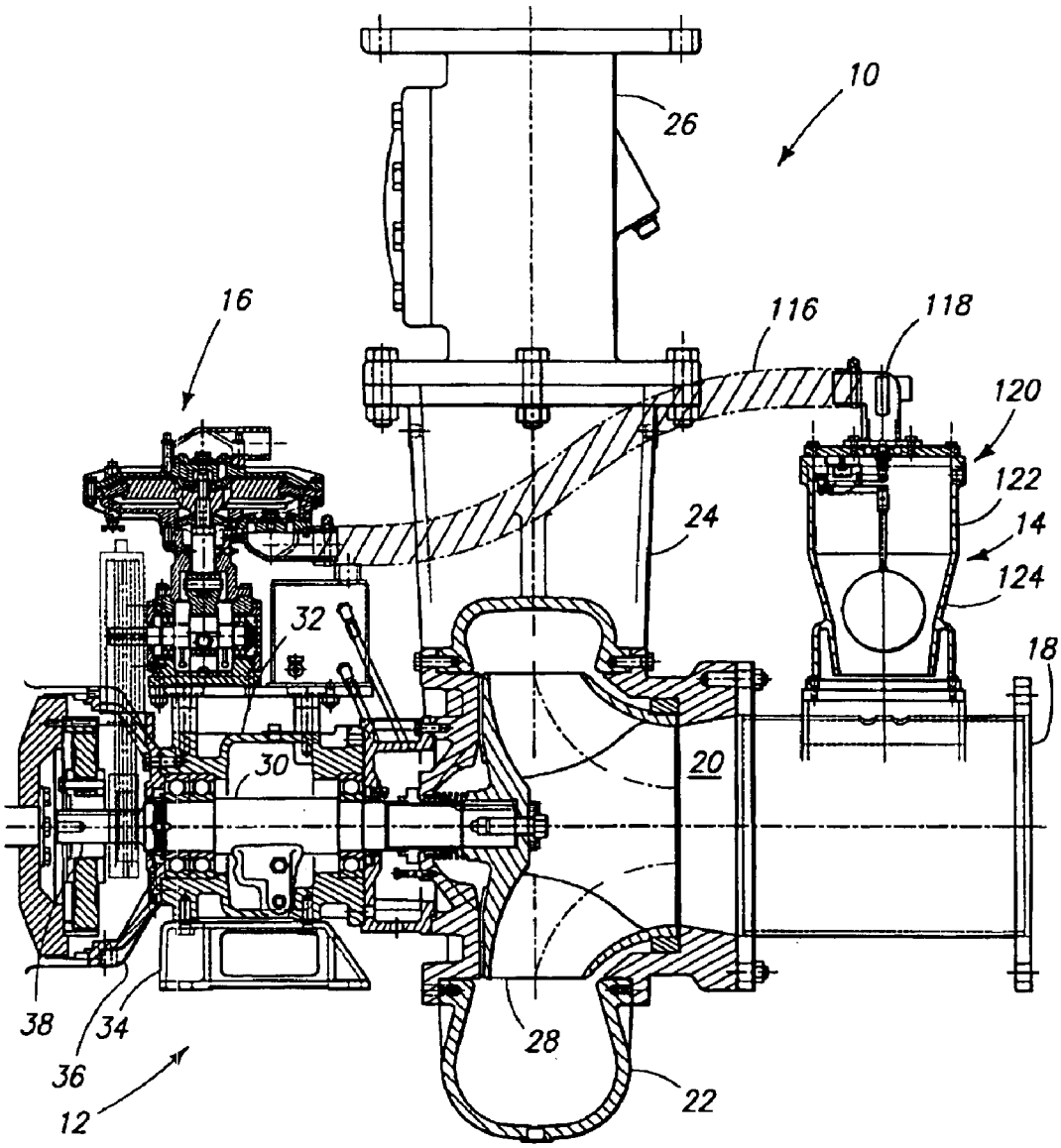
FIG. 1 is a side elevational view of a pump according to the present invention.

A pump according to the present invention is shown generally at 10 in FIG. 1. Pump 10 includes a centrifugal section 12, a float valve assembly 14 and a vacuum pump assembly 16. The centrifugal section includes an intake 18 leading to an eye 20 of a volute 22. The volute has an output 24 to which is connected a check valve 26 to prevent reverse flow when the pump is priming or idle. An impeller 28 is mounted inside the volute on a shaft 30. The shaft is supported by a bearing housing 32, which is mounted on a pedestal 34. A bracket or bell housing 36 connects the bearing frame to a motor (not shown). A combustion motor is often used for dewatering applications because it eliminates the need for electrical power, although an electric motor may be used as well in which case the bell housing is not required. Shaft 30 has a drive end 38, which is driven by the motor.

The portion of pump 10 described above is a standard centrifugal pump, such as a Cornell Pump Company Model No. 14NHGH-F18DB. It should be noted that this pump has a scaling system that allows the pump to safely run dry for extended periods of time. This system includes an oil reservoir to provide cooling. While the centrifugal pump will efficiently pump water or other liquids, it will not draw significant vacuum when operated dry. Priming is accomplished with the previously mentioned vacuum pump assembly and regulated by the float valve.

Figure 2:
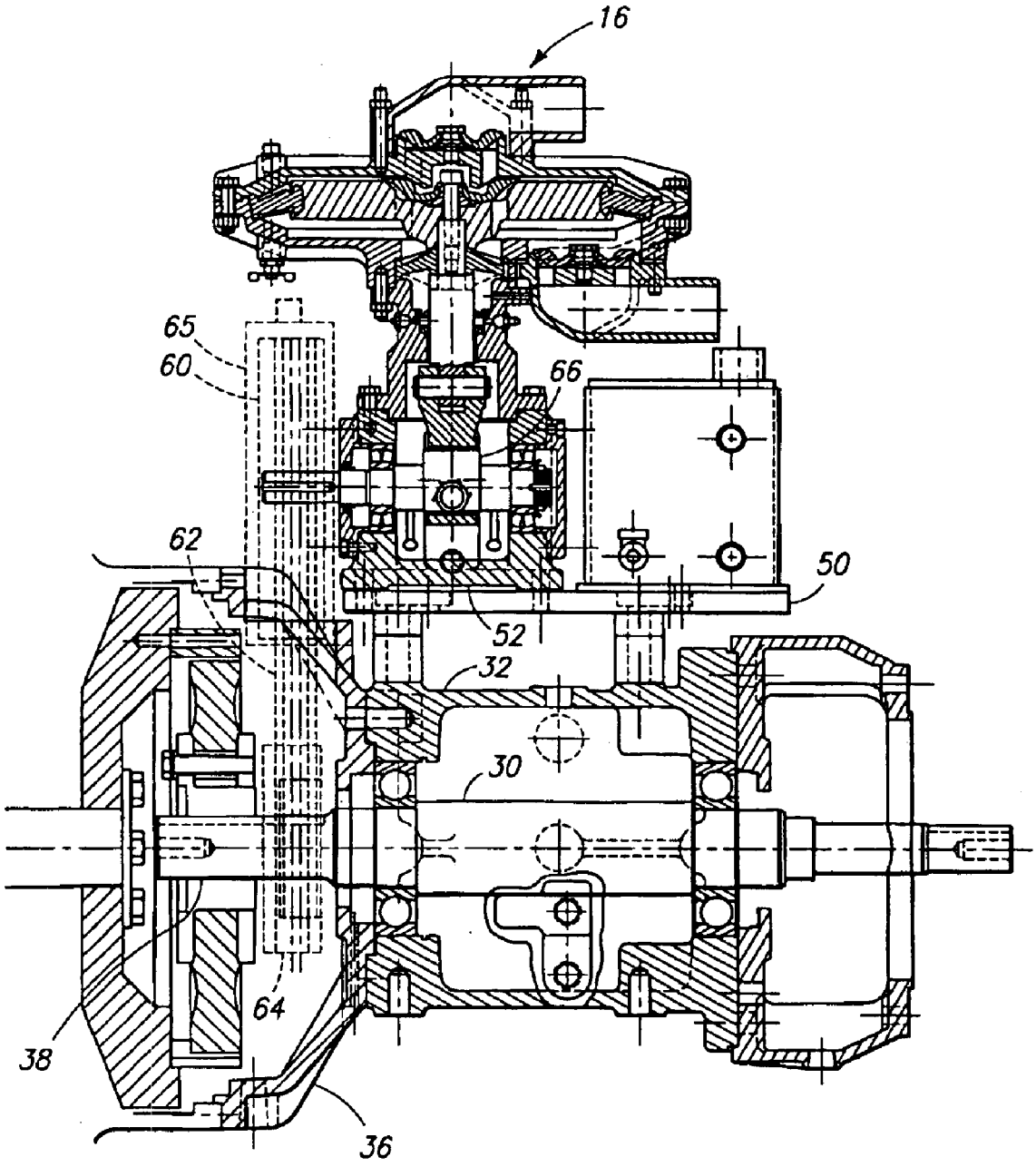
FIG. 2 is an enlarged view of a portion of the pump of FIG. 1.
Figure 3:
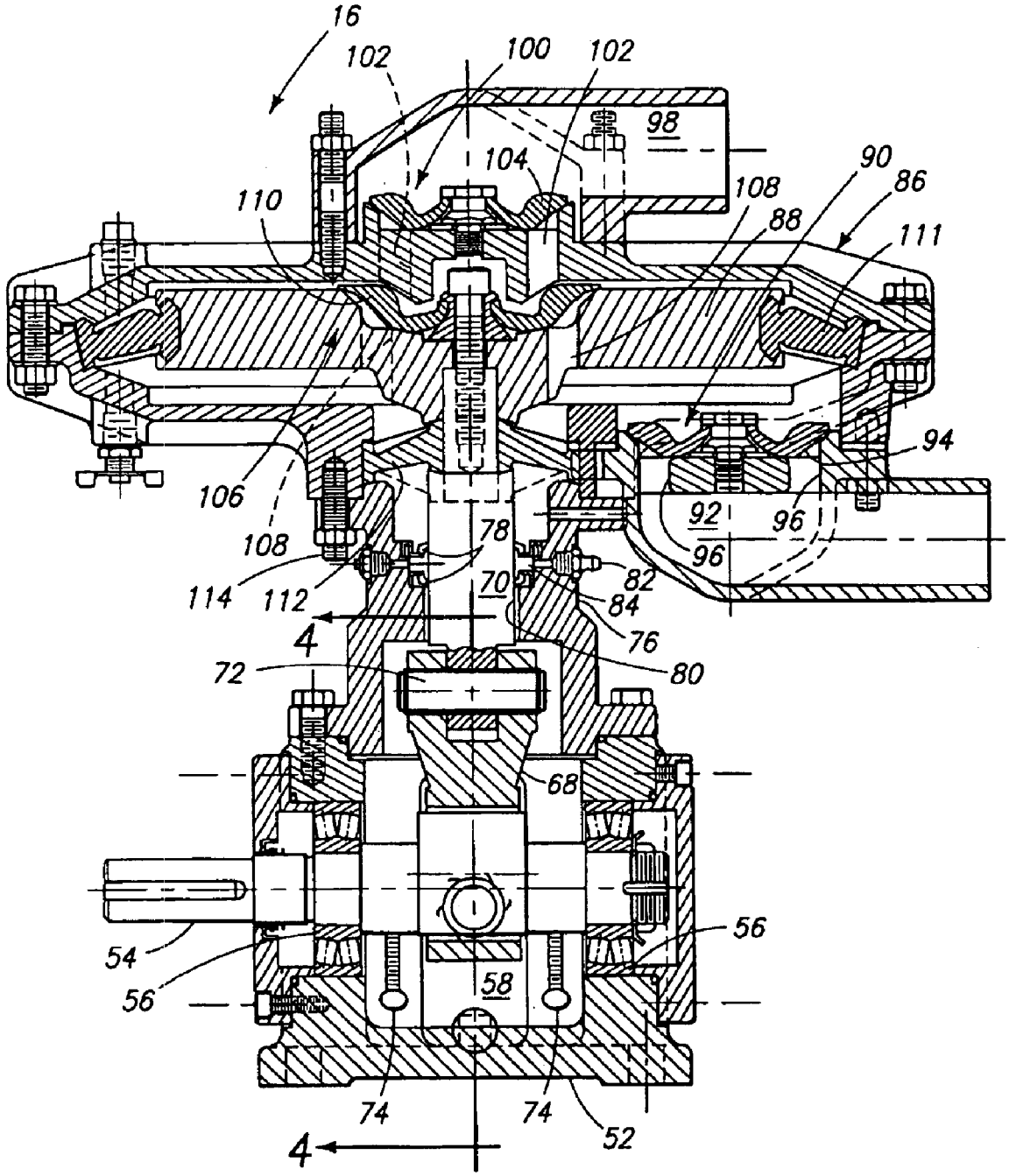
FIG. 3 is a side elevational view of a vacuum pump assembly according to the present invention.

As shown in FIG. 2, vacuum pump assembly 16 is mounted to the top of bearing housing 32 on a mounting plate 50. A housing or base 52 is bolted to the plate and supports a shaft 54 on bearings 56. See FIGS. 2 and 3. Base 52 also contains an oil reservoir 58. Shaft 54 projects through one end of base 52 to support a pulley 60. A drive linkage in the form of a belt 62 connects pulley 60 to a pulley 64 mounted on drive end 38 of shaft 30, passing through bell housing 36. Thus, when the motor turns shaft 30 to turn impeller 28, the belt and pulleys simultaneously turn shaft 54 in vacuum pump assembly 16. A guard 65 covers the pulley and belt.

Figure 4:
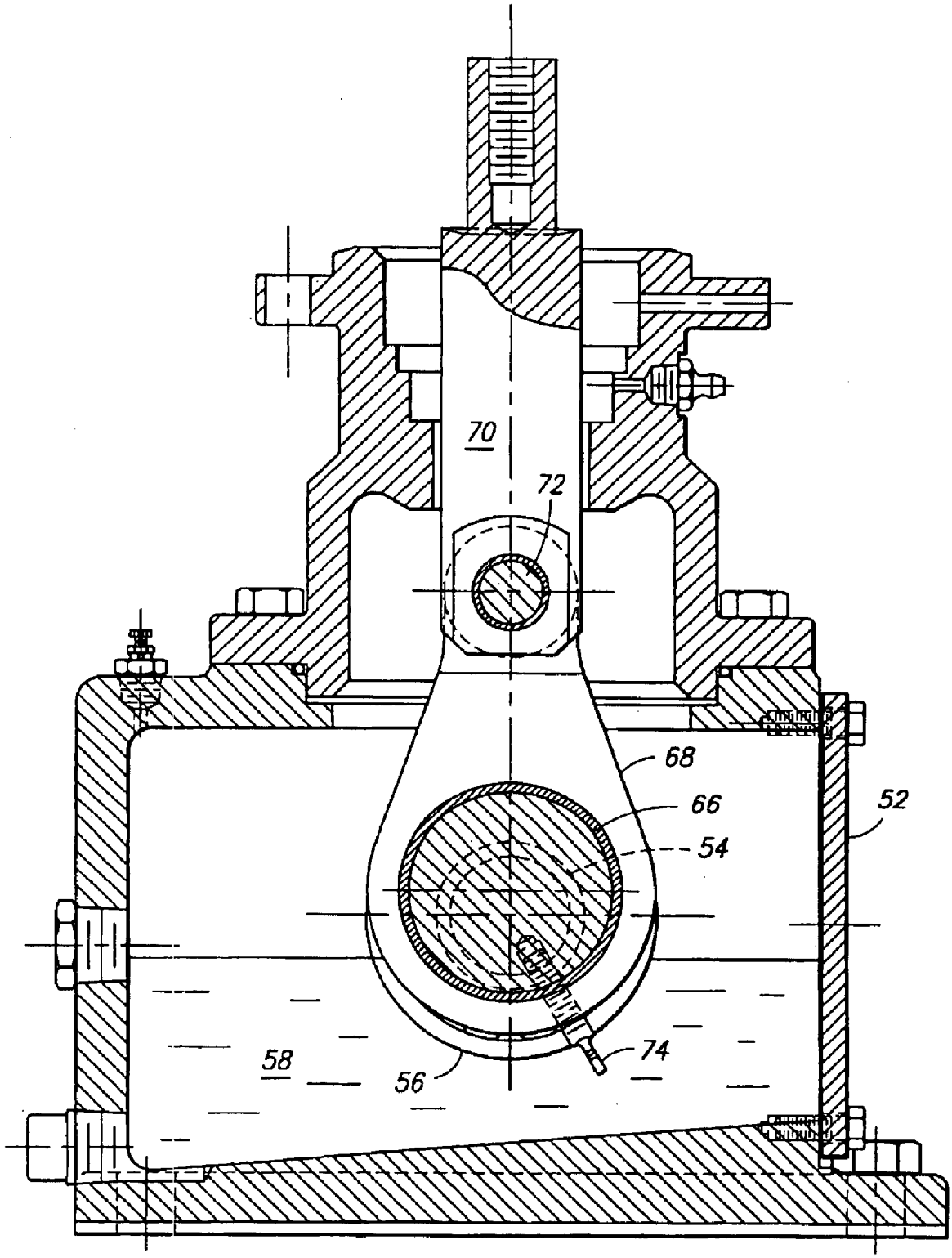
FIG. 4 is a partial cross sectional view of part of a vacuum pump assembly taken along lines 4—4 in FIG. 3.

Shaft 54 includes an eccentric section 66 to which is mounted a connecting rod 68. See FIG. 4. Connecting rod 68 is tied to a slider 70 by a pin 72. An oil delivery system in the form of two oil flingers 74 attached to shaft 54 throws oil in the oil reservoir up onto the connecting rod, pin and slider to insure adequate lubrication. The flingers are rigid and similar to a thumb screw screwed into shaft 54. In should be understood, that the flingers could also take many other configurations, such as flexible strips or a partially submerged disk which could likewise flip oil onto components above the oil level. Alternatively, some type of pumping system could be provided to convey oil onto the moving components that are not in contact with the oil bath.

Slider 70 extends upward through a sleeve section 76 that is bolted to the top of base 52. Sleeve 76 includes two seals 78 and a bushing 80 to guide slider 70. A grease fitting 82 allows introduction of grease into a cavity 84 between the seals.

A diaphragm housing 86 is mounted to the top of sleeve 76 and encloses a pump chamber that houses a diaphragm 88. Diaphragm 88 is mounted to the top of slider 70 and is driven up and down with the slider when shaft 54 rotates. As the diaphragm moves up and down in the pump chamber, air is moved by operation of three check valves. As the diaphragm moves up in the chamber, air is drawn through an intake check valve 90 positioned in an intake port 92. T he check valve includes a disk-shaped rubber seal 94, which is positioned over a number of holes 96 in the chamber in the intake port. As the diaphragm rises and generates a vacuum, the seal is lifted and air is drawn into the lower portion of the chamber.

At the same time that air being drawn into the lower portion of the chamber, the diaphragm is compressing air in the upper portion and forcing it into an output port 98 through an output check valve 100 via holes 102. Output check valve 100 is similar to intake check valve 90 and includes a seal 104 which lifts to release air as positive pressure is generated in the upper portion of the pump chamber. The output check valve is centered over the diaphragm to maximum flow rate through the output port.

After the diaphragm has completed its upward motion, it begins to move down, closing both the intake and output check valves. Subsequently pressure begins to drop above the diaphragm and rise below, causing a flexible rubber seal 110 in a diaphragm check valve 106 to open, allowing air to move from below the diaphragm to above through holes 108. It should be noted that the upper and lower portions of the pump chamber are separated by a flexible rubber seal 111 extending between the perimeter of the diaphragm and the wall of the chamber. Similarly, a flexible seal 112 extending between the slider and the wall of the chamber seals the bottom of the chamber. It should also be noted that, in contrast to prior designs, bolts 114 holding the chamber housing to the sleeve are not installed from inside the cavity, thereby eliminating a possible source of air leakage.

Figure 5:
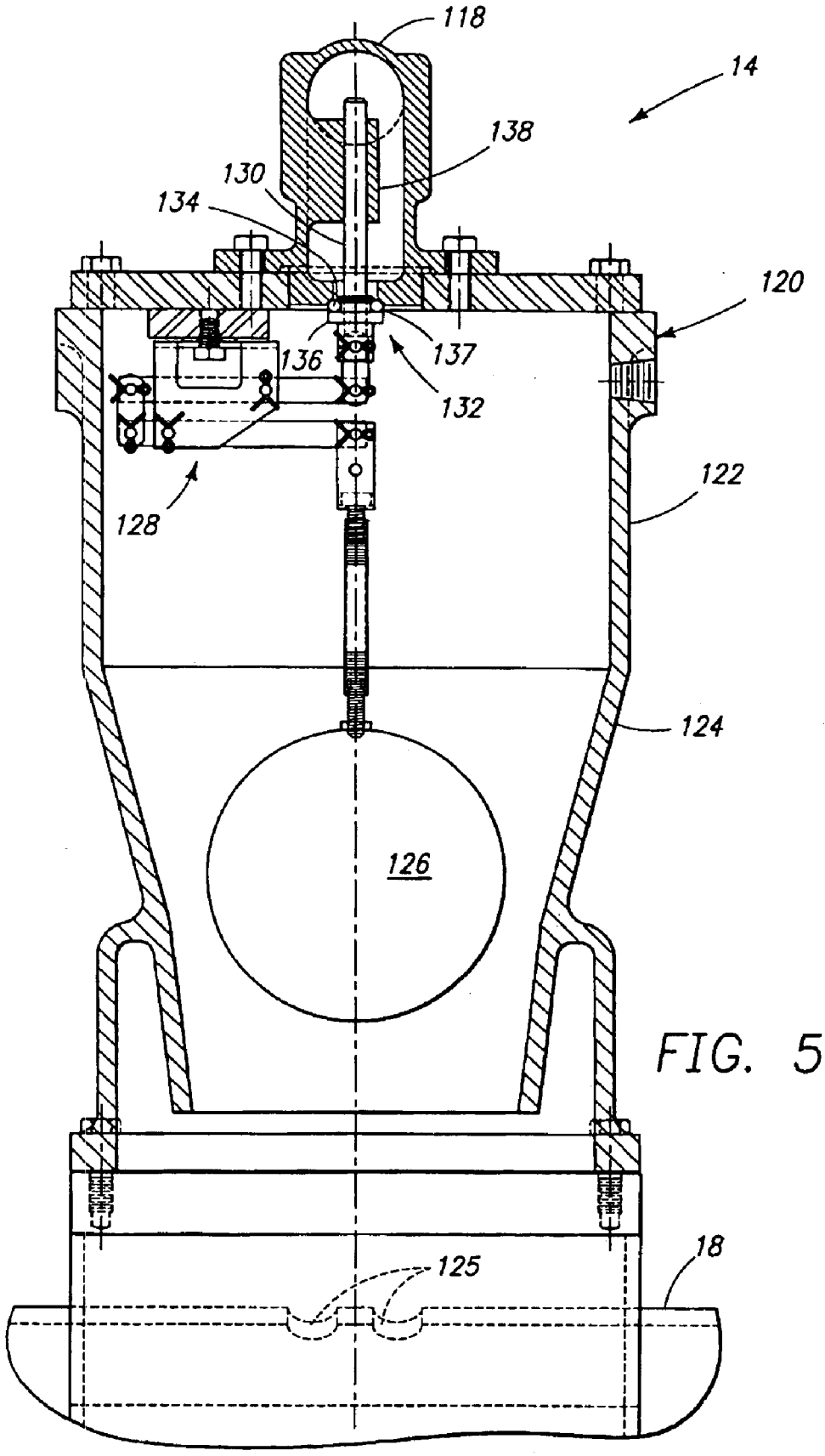
FIG. 5 is a partial cross-sectional view of a float valve assembly according to the present invention.

Vacuum pump assembly 16 is connected by a hose 116 to an output port 118 on float valve assembly 14. As shown in FIG. 5, the output port is mounted atop a valve housing or float box 120, an upper portion 122 of which is cylindrical and a lower portion 124 of which is frustro-conical in shape. The float box is mounted on the intake of the centrifugal pump. Holes 125 allow water to rise into the float box from the intake.

When there is no water in the float box, a float 126 hangs freely. The float is connected through linkage assembly 128 to a valve stem 130. A seal 132, consisting of an o-ring 134 supported by a small flange 136, is mounted on the valve stem and positioned away from a valve seat 137 formed in the float box when the float is hanging freely. This configuration allows air to be drawn through the valve seat and into the output port for subsequent delivery to the vacuum pump. The upper portion of stem 130 is supported in a guide 138 formed in output port 118. This guide allows the stem to move up and down freely, but restricts lateral movement.

As water enters the float box and lifts the float, the linkage shifts the valve stem 130 upward to push the seal against the valve seat, thereby stopping withdrawal of air from the housing. This action prevents the water from being drawn into the vacuum pump. The absence of sharp projections in the float box reduces that chance that the float ball will become hung on the side of the float box, as may occur with existing designs.

It should be noted that the valve tends be held closed by the vacuum that builds quickly after the valve closes because of the cross-sectional area of the seal and stem. As a result, a hysteresis effect is created whereby the valve will not open until the water drops well below the level at which the valve first closed. Similarly, after opening, the valve will not close again until the water rises well above the level where the valve opened. The amount of hysteresis can be established by balancing the cross-sectional area of the valve against the size and density of the ball. The hysteresis is important because, as the pump is being primed, water flow is turbulent and subject to surging which would otherwise cause the valve to repeatedly open and close. The small area of holes 125 also helps to reduce fluctuations in the level of water in the valve housing.

While the invention has been disclosed in its preferred form, the specific embodiments thereof as disclosed and illustrated herein are not to be considered in a limiting sense as numerous variations are possible. Applicants regard the subject matter of their invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of applicants' invention.

What is claimed is:

1. A self-priming pump, comprising:

a centrifugal pump section including a volute and an impeller disposed in the volute and supported on an impeller shaft, the impeller shaft being supported in a bearing housing and having a drive end opposite the impeller, the pump section further including a bracket attached to the bearing housing and surrounding the drive end of the impeller shaft;

a motor mounted to the bracket and configured to turn the impeller shaft;

a vacuum pump assembly mounted to the centrifugal pump section and having a vacuum pump input shaft configured to actuate a diaphragm-type vacuum pump upon rotation, *where the diaphragm-type vacuum pump includes a diaphragm and an output check valve centered over the diaphragm*; and a drive linkage extending from the drive end of the impeller shaft through the bracket and to the vacuum pump input shaft, the drive linkage being configured to transfer power from the drive end of the impeller shaft to the vacuum pump assembly when the motor turns the shaft.

2. The self-priming pump of claim 1, where the bracket is removably attached to the bearing housing.

3. The self-priming pump of claim 1, where the impeller includes a bore in which an impeller end of the impeller shaft is received to secure the impeller to the impeller shaft.

4. The self-priming pump of claim 3, further comprising a threaded fastener that is aligned parallel to the impeller shaft and extended into the impeller end of the impeller shaft to secure the impeller to the impeller shaft.

5. The self-priming pump of claim 1, where the vacuum pump assembly is mounted to the bearing housing via bolt-type fasteners that extend perpendicularly to an upper portion of the bearing housing.

6. The self-priming pump of claim 5, where spacers are positioned between a bottom portion of the vacuum pump assembly and the upper portion of the bearing housing.

7. The self-priming pump of claim 1, where the motor is an electric motor.

8. The self-priming pump of claim 1, where the motor is a combustion-type motor.

[9. The self-priming pump of claim 1 where the diaphragm-type vacuum pump includes a diaphragm and an output check valve centered over the diaphragm.]

10. The self-priming pump of claim 1, where the diaphragm-type vacuum pump includes a plurality of check valves configured to inhibit reverse airflow through the diaphragm-type vacuum pump.

11. The self-priming pump of claim 1, further comprising a mechanical seal configured to provide a seal between the impeller shaft and the centrifugal pump section.

12. A self-priming pump, comprising:

a centrifugal pump section including a volute and an impeller disposed in the volute and supported on an impeller shaft, the impeller shaft being supported in a bearing housing and having a drive end opposite the impeller *and an impeller end secured within a blind bore formed in the impeller*, the pump section further including a bracket removably attached to the bearing housing and surrounding the drive end of the impeller shaft;

a motor mounted to the bracket and configured to turn the impeller shaft;

a vacuum pump assembly mounted to the centrifugal pump section and having a vacuum pump input shaft configured to actuate a diaphragm-type vacuum pump upon rotation; and a drive linkage coupled between the drive end of the impeller shaft and the vacuum pump input shaft and configured to transfer power to the vacuum pump assembly when the motor turns the impeller shaft.

13. A self-priming pump, comprising:

a centrifugal pump section including an intake, a volute and an impeller disposed in the volute and supported on an impeller shaft, the impeller shaft being supported in a bearing housing and having a drive end opposite the impeller, the pump section further including a bracket attached to the bearing housing and surrounding the drive end of the impeller shaft;

a motor mounted to the bracket and configured to turn the impeller shaft; and a vacuum pump assembly including a diaphragm-type vacuum pump mounted to the centrifugal pump section and *having a diaphragm and an output check valve centered over the diaphragm, the vacuum pump assembly being* configured to generate, upon rotation of the impeller shaft, a vacuum in order to draw fluid to the impeller via the intake and thereby prime the centrifugal pump section, where the self-priming pump is configured to fluidly de-couple the vacuum pump assembly from the intake upon priming of the centrifugal pump section to inhibit fluid from entering the vacuum pump assembly.

14. The self-priming pump of claim 13, where the bracket is removably attached to the bearing housing.

15. The self-priming pump of claim 13, where the impeller includes a bore in which an impeller end of the impeller shaft is received to secure the impeller to the impeller shaft.

16. The self-priming pump of claim 15, further comprising a threaded fastener that is aligned parallel to the impeller shaft and extended into the impeller end of the impeller shaft to secure the impeller to the impeller shaft.

17. The self-priming pump of claim 13, where the vacuum pump assembly is mounted to the bearing housing via bolt-type fasteners that extend perpendicularly to an upper portion of the bearing housing.

18. The self-priming pump of claim 17, where spacers are positioned between a bottom portion of the vacuum pump assembly and the upper portion of the bearing housing.

19. The self-priming pump of claim 13, where the motor is an electric motor.

20. The self-priming pump of claim 13, where the motor is a combustion-type motor.

[21. The self-priming pump of claim 13 where the diaphragm-type vacuum pump includes a diaphragm and an output check valve centered over the diaphragm.]

22. The self-priming pump of claim 13, where the diaphragm-type vacuum pump includes a plurality of check valves configured to inhibit reverse airflow through the diaphragm-type vacuum pump.

23. The self-priming pump of claim 13, further comprising a mechanical seal configured to provide a seal between the impeller shaft and the centrifugal pump section.

*24. The self-priming pump of claim 3, where the bore is a blind bore in which the impeller end of the impeller shaft is received and secured.*

*25. The self-priming pump of claim 15, where the bore is a blind bore in which the impeller end of the impeller shaft is received and secured.*

*26. A self-priming pump, comprising:*

*a centrifugal pump section including an impeller disposed within a volute;*

*an impeller shaft supported at least partially within a bearing housing and having a first end secured within a blind bore provided in the impeller and a drive end opposite the first end;*

*a removable bracket attachable to the bearing housing, where when attached to the bearing housing, the removable bracket at least partially surrounds the drive end of the impeller shaft;*

*a motor mounted to the bracket and configured to turn the impeller shaft;*

*a vacuum pump assembly mounted to the centrifugal pump section and having a vacuum pump input shaft configured to actuate a diaphragm-type vacuum pump upon rotation; and*

*a drive linkage extending from the drive end of the impeller shaft through an opening in the bracket and to the vacuum pump input shaft, the drive linkage being configured to transfer power from the drive end of the impeller shaft to the vacuum pump assembly when the motor turns the shaft.*

* * * * *